US010914190B2

(12) United States Patent
Motoda

(10) Patent No.: US 10,914,190 B2
(45) Date of Patent: Feb. 9, 2021

(54) VARIABLE NOZZLE UNIT AND TURBOCHARGER

(71) Applicant: IHI Corporation, Koto-ku (JP)

(72) Inventor: Natsuko Motoda, Koto-ku (JP)

(73) Assignee: IHI Corporation, Koto-ku (JP)

( * ) Notice: Subject to any disclaimer, the term of this patent is extended or adjusted under 35 U.S.C. 154(b) by 56 days.

(21) Appl. No.: 16/345,882

(22) PCT Filed: Oct. 31, 2017

(86) PCT No.: PCT/JP2017/039384
§ 371 (c)(1),
(2) Date: Apr. 29, 2019

(87) PCT Pub. No.: WO2018/084154
PCT Pub. Date: May 11, 2018

(65) Prior Publication Data
US 2019/0249563 A1 Aug. 15, 2019

(30) Foreign Application Priority Data

Nov. 1, 2016 (JP) .................................. 2016-214466

(51) Int. Cl.
*F01D 17/16* (2006.01)
*F02B 37/24* (2006.01)
(Continued)

(52) U.S. Cl.
CPC ............ *F01D 17/165* (2013.01); *F01D 9/02* (2013.01); *F01D 9/04* (2013.01); *F01D 17/16* (2013.01); *F02B 37/24* (2013.01); *Y02T 10/12* (2013.01)

(58) Field of Classification Search
CPC ...... F01D 17/165; F01D 17/09; F01D 17/041; F01D 5/141; F05D 2240/121; F05D 2240/122; F05D 2250/90; F02B 37/24
See application file for complete search history.

(56) References Cited

U.S. PATENT DOCUMENTS 8,109,715 B2 * 2/2012 Renaud ................. F01D 17/165
                                                    415/160
8,834,104 B2 * 9/2014 Mohamed ............. F01D 17/165
                                                    415/164
(Continued)

FOREIGN PATENT DOCUMENTS

CN        201228563 Y      4/2009
CN        102203396 A      9/2011
(Continued)

OTHER PUBLICATIONS

International Search Report dated Dec. 19, 2017 in PCT/JP2017/039384, 1 page.

*Primary Examiner* — Ninh H. Nguyen
(74) *Attorney, Agent, or Firm* — Oblon, McClelland, Maier & Neustadt, L.L.P.

(57) ABSTRACT

A variable nozzle unit includes a variable nozzle vane which is disposed between a hub wall surface and a shroud wall surface and is rotatable around a rotation axis parallel to a rotation axis of a turbine impeller inside a gas flow passage. The variable nozzle vane includes a leading edge, a trailing edge, a hub end surface facing a hub wall surface, and a shroud end surface facing a shroud wall surface. The variable nozzle vane is twisted around a twist center located between the trailing edge and the rotation axis so that the hub end surface protrudes to a radial outside of a rotation axis in relation to the shroud end surface at the leading edge side and the hub end surface protrudes to a radial inside of the rotation axis in relation to the shroud end surface at the trailing edge side.

16 Claims, 11 Drawing Sheets

(51) Int. Cl.
    *F01D 9/04*        (2006.01)
    *F01D 9/02*        (2006.01)

(56) References Cited

U.S. PATENT DOCUMENTS

| | | | |
|---|---|---|---|
| 9,890,700 B2* | 2/2018 | Sun | F02B 39/00 |
| 2011/0206500 A1 | 8/2011 | Nagao et al. | |
| 2011/0314808 A1 | 12/2011 | Mohamed et al. | |
| 2012/0328420 A1 | 12/2012 | Ikeda et al. | |
| 2014/0112764 A1 | 4/2014 | Morita | |
| 2014/0341729 A1* | 11/2014 | Osako | F01D 17/165 |
| | | | 415/208.1 |

FOREIGN PATENT DOCUMENTS

| | | |
|---|---|---|
| CN | 102822532 A | 12/2012 |
| CN | 105143635 A | 12/2015 |
| JP | 2015-14252 A | 1/2015 |
| JP | 2015-31237 A | 2/2015 |
| JP | 2015-194092 A | 11/2015 |
| WO | WO 2010/052911 A1 | 5/2010 |
| WO | WO 2012/161280 A1 | 11/2012 |

\* cited by examiner

VARIABLE NOZZLE UNIT AND TURBOCHARGER

TECHNICAL FIELD

The present disclosure relates to a variable nozzle unit and a turbocharger.

BACKGROUND ART

Conventionally, as described in Patent Documents 1 and 2, a variable nozzle vane for changing a flow passage area (a throat area) of a gas flowing into a turbine impeller is known. The variable nozzle vane is rotatable about an axis parallel to a rotation axis of the turbine impeller. By the rotation of the variable nozzle vane, the flow passage area of the gas can be changed.

The variable nozzle vane described in Patent Document 1 is configured to be twisted around a trailing edge so that a shroud side protrudes inward in the radial direction in relation to a huh side. Accordingly, a side clearance flow decreases and hence an energy loss area at an inlet side of the turbine impeller decreases. The variable nozzle vane described in Patent Document 2 is formed in a shape which is swept in a chord length direction, leans in a warp direction, and twists around a rotation axis of the variable nozzle vane.

CITATION LIST

Patent Literature

Patent Document 1: Japanese Unexamined Patent Publication No. 2015-14252
Patent Document 2: US Patent No. 2011/0314808

SUMMARY OF INVENTION

Technical Problem

In the variable nozzle vane described in Patent Document 1, a three-dimensional shape twisted around the trailing edge is adopted, and so the variable nozzle vane is brought close to the shroud side and a side clearance on the shroud side is set to be smaller than a side clearance on the hub side. Accordingly, since a shroud side clearance flow decreases, the turbine efficiency of the variable displacement type turbocharger can be improved. With a variable nozzle vane, however, a thrust force pressing against the hub side can be applied to the variable nozzle vane. Due to this thrust force, the variable nozzle vane cannot be easily brought close to the shroud side. In the variable nozzle vane described in Patent Document 2, the vane surface shape is examined and the reduction of the clearance flow is not mentioned.

The present disclosure will describe a variable nozzle unit and a turbocharger capable of moving a variable nozzle vane toward a shroud side.

Solution to Problem

According to an aspect of the present disclosure, there is provided a variable nozzle unit used in a turbine including a gas flow passage through which a gas flowing from a scroll flow passage to a turbine impeller passes and a hub wall surface and a shroud wall surface, which face each other in a direction of a rotation axis of the turbine impeller and form the gas flow passage, the variable nozzle including: a variable nozzle vane which is disposed between the hub wall surface and the shroud wall surface and is rotatable about a rotation axis parallel to the rotation axis of the turbine impeller inside the gas flow passage, wherein the variable nozzle vane includes a leading edge, a trailing edge, a hub end surface facing the hub wall surface, and a shroud end surface facing the shroud wall surface, and wherein the variable nozzle vane is twisted around a twist center located between the trailing edge and the rotation axis so that the hub end surface protrudes to a radial outside of the rotation axis in relation to the shroud end surface at the leading edge side and the hub end surface protrudes to a radial inside of the rotation axis in relation to the shroud end surface at the trailing edge side.

Effects of Invention

According to an aspect of the present disclosure, it is possible to easily move a variable nozzle vane toward a shroud side.

DESCRIPTION OF EMBODIMENTS

Figure 1:
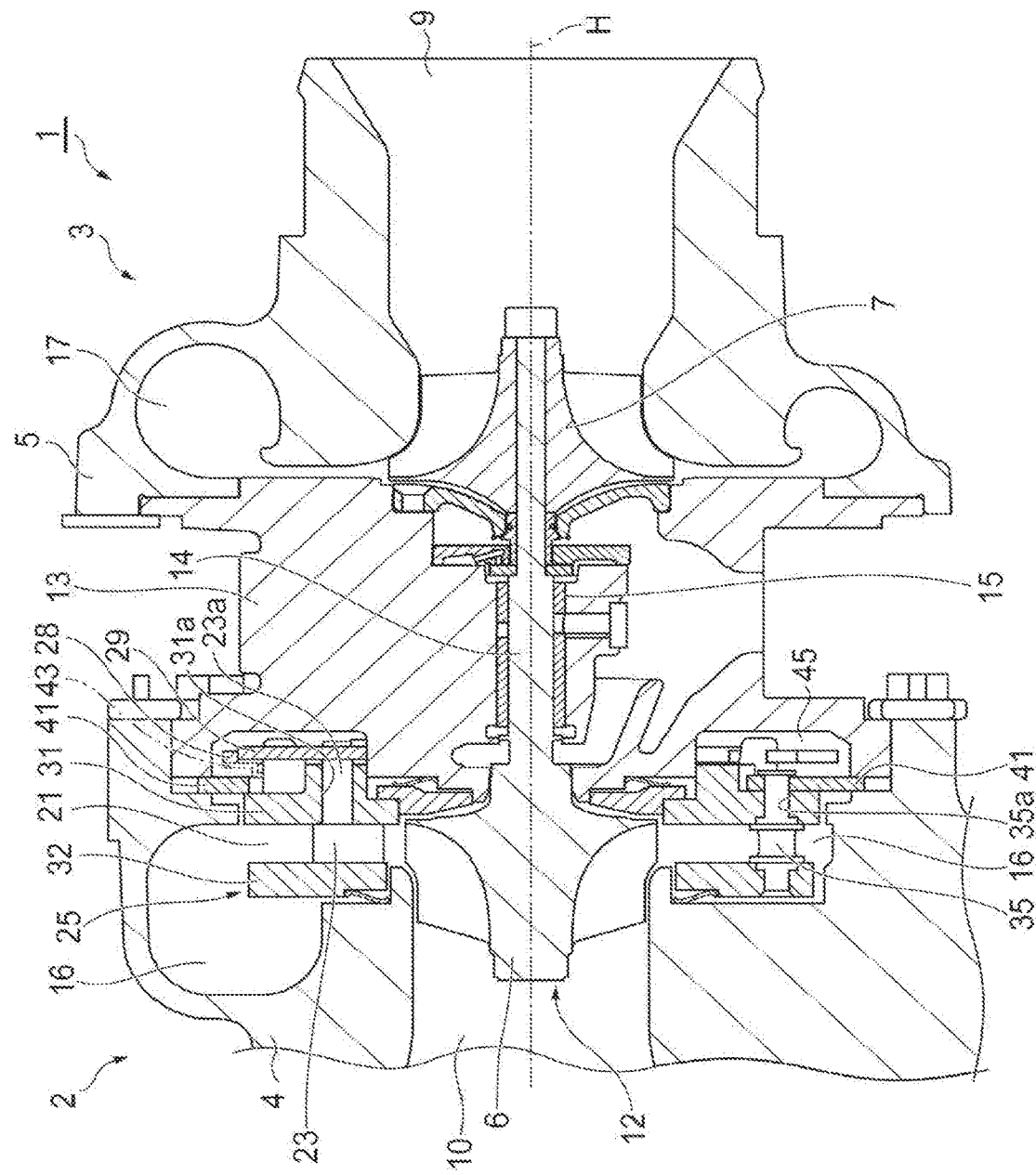
FIG. 1 is a cross-sectional view of a turbocharger according to an embodiment of the present disclosure.

According to an aspect of the present disclosure, there is provided a variable nozzle unit used in a turbine including a gas flow passage through which a gas flowing from a scroll flow passage to a turbine impeller passes and a hub wall surface and a shroud wall surface which face each other in a direction of a rotation axis of the turbine impeller and form the gas flow passage, including: a variable nozzle vane which is disposed between the hub wall surface and the shroud wall surface and is rotatable about a rotation axis parallel to the rotation axis of the turbine impeller inside the gas flow passage, wherein the variable nozzle vane includes a leading edge, a trailing edge, a hub end surface facing the hub wall surface, and a shroud end surface facing the shroud wall surface, and wherein the variable nozzle vane is twisted around a twist center located between the trailing edge and the rotation axis so that the hub end surface protrudes to a radial outside of the rotation axis in relation to the shroud end surface at the leading edge side and the hub end surface protrudes to a radial inside of the rotation axis in relation to the shroud end surface at the trailing edge side.

In the variable nozzle unit, the variable nozzle vane is twisted around the twist center located between the trailing edge and the rotation axis. When the twist center is disposed in this way, the hub end surface protrudes to the radial outside of the rotation axis in relation to the shroud end surface at the leading edge side and the hub end surface protrudes to the radial inside of the rotation axis in relation to the shroud end surface at the trailing edge side. Since the huh end surface protrudes to the radial inside, the protruding area of the hub end surface toward the radial outside decreases. Accordingly, a thrust force applied to the radial outside (the high pressure side) of the variable nozzle vane, that is, a thrust force pressing against the hub side decreases. Since the thrust force toward the hub side decreases, the variable nozzle vane can easily move toward the shroud side. As a result, it is easy to adjust the axial position of the variable nozzle vane inside the gas flow passage as compared with the variable nozzle vane described in Patent Document 1.

In some aspects, the twist angle between the hub end surface and the shroud end surface is set to 1.0 to 5.0°. In this case, the turbine efficiency improvement effect and the thrust force reduction effect can be appropriately exhibited.

In some aspects, an outer area in which the hub end surface protrudes to the radial outside in relation to the shroud end surface is larger than an inner area in which the hub end surface protrudes to the radial inside in relation to the shroud end surface. In this case, since a distance between vanes at the leading edge side of the hub end surface in two adjacent variable nozzle vanes increases, the shroud side clearance flow can be decreased. Thus, the turbine efficiency improvement effect is obtained.

In some aspects, the twist center is located in a region of 70 to 85% from the leading edge with respect to a distance between the leading edge and the trailing edge. Since the twist center is disposed in a region of 70 to 85% from the leading edge, it is possible to realize a more appropriate balance in a relationship between the protruding area of the hub end surface toward the radial outside and the protruding area thereof toward the radial inside. Thus, the turbine efficiency improvement effect and the thrust force reduction effect can be appropriately exhibited.

According to a turbocharger including any one of the variable nozzle units provided in the turbine, the turbine performance is improved.

Hereinafter, an embodiment of a variable displacement type turbocharger of the present disclosure will be described with reference to the drawings. Furthermore, in the drawings, since the features of constituent elements may be exaggeratedly depicted, a dimensional ratio of each part in the drawings does not necessarily match a real one.

A variable displacement type turbocharger 1 illustrated in FIG. 1 is applied to, for example, an internal combustion engine of a ship or a vehicle. As illustrated in FIG. 1, the variable displacement type turbocharger 1 includes a turbine 2 and a compressor 3. The turbine 2 includes a turbine housing 4 and a turbine impeller 6 accommodated in the turbine housing 4. The turbine housing 4 includes a scroll flow passage 16 which extends in the circumferential direction around the turbine impeller 6. The compressor 3 includes a compressor housing 5 and a compressor impeller 7 accommodated in the compressor housing 5. The compressor housing 5 includes a scroll flow passage 17 which extends in the circumferential direction around the compressor impeller 7.

The turbine impeller 6 is provided at one end of a rotary shaft 14. The compressor impeller 7 is provided at the other end of the rotary shaft 14. A bearing housing 13 is provided between the turbine housing 4 and the compressor housing 5. The rotary shaft 14 is rotatably supported by the bearing housing 13 through the bearing 15 and the rotary shaft 14, the turbine impeller 6, and the compressor impeller 7 rotate about a rotation axis H as an integrated rotation body 12.

The turbine housing 4 is provided with an exhaust gas inlet (not illustrated) and an exhaust gas outlet 10. An exhaust gas which is discharged from an internal combustion engine (not illustrated) flows into the turbine housing 4 through the exhaust gas inlet and flows into the turbine impeller 6 through the scroll flow passage 16 to rotate the turbine impeller 6. Then, the exhaust gas is discharged to the outside of the turbine housing 4 through the exhaust gas outlet 10.

The compressor housing 5 is provided with a suction port 9 and a discharge port (not illustrated). When the turbine impeller 6 rotates as described above, the compressor impeller 7 rotates through the rotary shaft 14. The rotating compressor impeller 7 sucks external air through the suction port 9, compresses the air, and discharges the compressed air from the discharge port through the scroll flow passage 17. The compressed air which is discharged from the discharge port is supplied to the above-described internal combustion engine.

Next, the turbine 2 will be described in more detail. The turbine 2 is a variable displacement type turbine and a plurality of variable nozzle vanes 23 are provided in a gas flow passage 21 connecting the scroll flow passage 16 and the turbine impeller 6. The plurality of variable nozzle vanes 23 are arranged in the circumferential direction around the rotation axis H and each variable nozzle vane 23 rotates about a rotation axis L (see FIG. 5A) parallel to the rotation axis H. The gas flow passage 21 causes a gas flowing from the scroll flow passage 16 to the turbine impeller 6 to flow therethrough. When the variable nozzle vane 23 rotates as described above, the cross-sectional area (the throat area) of the gas flow passage is optimally adjusted in response to the flow amount of the exhaust gas flowing into the turbine 2.

As described above, the turbine 2 includes a variable nozzle unit 25 as a drive mechanism for rotating the variable nozzle vane 23. The variable nozzle unit 25 is fitted into the turbine housing 4 and is fixed between the turbine housing 4 and the bearing housing 13.

Hereinafter, the variable nozzle unit 25 which is applied to the turbine 2 of the variable displacement type turbocharger 1 will be described with reference to FIGS. 1 and 2. In the description below, the "axial direction", the "radial direction", and the "circumferential direction" simply and respectively mean the direction of the rotation axis H, the rotational radial direction, and the rotational circumferential direction of the turbine impeller 6. Further, in the direction of the rotation axis H, a side close to the turbine 2 will be simply referred to as a "turbine side" and a side close to the compressor 3 will be simply referred to as a "compressor side".

The variable nozzle unit 25 includes the plurality of (in the example illustrated in the drawings, eleven) variable nozzle vanes 23 along with a first nozzle ring 31 and a second nozzle ring 32 which sandwich the variable nozzle vanes 23 in the axial direction. Each of the first nozzle ring 31 and the second nozzle ring 32 is formed in an annular shape about the rotation axis H and is disposed to surround the turbine impeller 6 in the circumferential direction. A region which is sandwiched between the first nozzle ring 31 and the second nozzle ring 32 forms the above-described gas flow passage 21. The second nozzle ring 32 faces the scroll flow passage 16 (see FIG. 1) and the second nozzle ring 32 forms a part of the inner wall of the scroll flow passage 16. A rotary shaft 23a of each variable nozzle vane 23 is rotatably inserted through a bearing hole 31a of the first nozzle ring 31 and the first nozzle ring 31 axially supports each variable nozzle vane 23 in a cantilevered manner. Furthermore, in the example illustrated in the drawings, the variable nozzle vanes 23 are arranged at the same interval in the circumferential direction, but the variable nozzle vanes 23 may not essentially be arranged at the same interval. FIG. 2 also illustrates the rotation direction D of the turbine impeller 6.

As illustrated in FIG. 1, an annular plate-shaped support ring 41 is fixed to the compressor side of the first nozzle ring 31 and an annular drive ring support member 43 is fixed to the compressor side of the support ring 41. Each of the first nozzle ring 31, the second nozzle ring 32, the support ring 41, and the drive ring support member 43 is provided with a plurality of (in the example illustrated in the drawings, three) pin holes 35a. When the connection pin 35 is inserted through each pin hole 35a, the first nozzle ring 31, the second nozzle ring 32, the support ring 41, and the drive ring support member 43 are connected.

Furthermore, the support ring 41 and the drive ring support member 43 are caulked to the first nozzle ring 31 by the compressor side portion of the connection pin 35. Further, the turbine side portion of the connection pin 35 is provided with two flange portions for respectively positioning the first nozzle ring 31 and the second nozzle ring 32. Since a dimension between two flange portions is manufactured with high accuracy, the accuracy of the axial dimension of the gas flow passage 21 is secured. When the drive ring 28 is attached to the drive ring support member 43, the drive ring 28 is supported to be rotatable about the rotation axis H. When the outer peripheral portion of the support ring 41 is sandwiched between the turbine housing 4 and the bearing housing 13 in the axial direction, the entire variable nozzle unit 25 is held by the turbine housing 4 and the bearing housing 13.

The drive ring 28 is a member that transmits a driving force input from the outside to the variable nozzle vane 23 and is formed as a single member by, for example, a metal material. The drive ring 28 is formed in an annular shape extending in the circumferential direction around the rotation axis H and rotates about the rotation axis H by a driving force transmitted from the outside. The lever 29 is attached to the rotary shaft 23a of each variable nozzle vane 23 and the levers are arranged at the same interval in the circumferential direction on the inside of the drive ring 28.

In such a variable nozzle unit 25, a portion which is formed by the first nozzle ring 31, the second nozzle ring 32, the support ring 41, and the connection pin 35 is fixed to the turbine housing 4 to axially support the plurality of variable nozzle vanes 23 in a rotatable manner.

Referring to the drawings from FIG. 2, the variable nozzle unit 25 and the variable nozzle vane 23 will be described in more detail. The plurality of variable nozzle vanes 23 are the same and have the same size and shape. A side clearance is formed in order to secure the reliability of the rotation operation of the plurality of variable nozzle vanes 23 disposed between the first nozzle ring 31 and the second nozzle ring 32. That is, as illustrated in FIG. 7, a hub side clearance CL1 can be formed between a hub wall surface 31b of the first nozzle ring 31 and a hub end surface 54 of the variable nozzle vane 23. A shroud side clearance CL2 can be formed between a shroud wall surface 32b of the second nozzle ring 32 and a shroud end surface 53 of the variable nozzle vane 23. From the viewpoint of the improvement in turbine efficiency, the shroud side clearance CL2 is desirably smaller than the hub side clearance CL1. Thus, the shroud side clearance CL2 is desirably zero (so that the shroud side clearance CL2 does not exist) during the operation of the variable displacement type turbocharger 1 (see FIG. 6).

In the variable nozzle unit 25, since a three-dimensional shape of the variable nozzle vane 23 is devised, a force (a thrust force) applied to the variable nozzle vane 23 in the axial direction is considered and hence the position of the variable nozzle vane 23 in the axial direction can be easily adjusted. That is, the three-dimensional shape of the variable nozzle vane 23 so that a balance of various forces F1 to F4 illustrated in FIG. 7 becomes a desired state.

Figure 2:
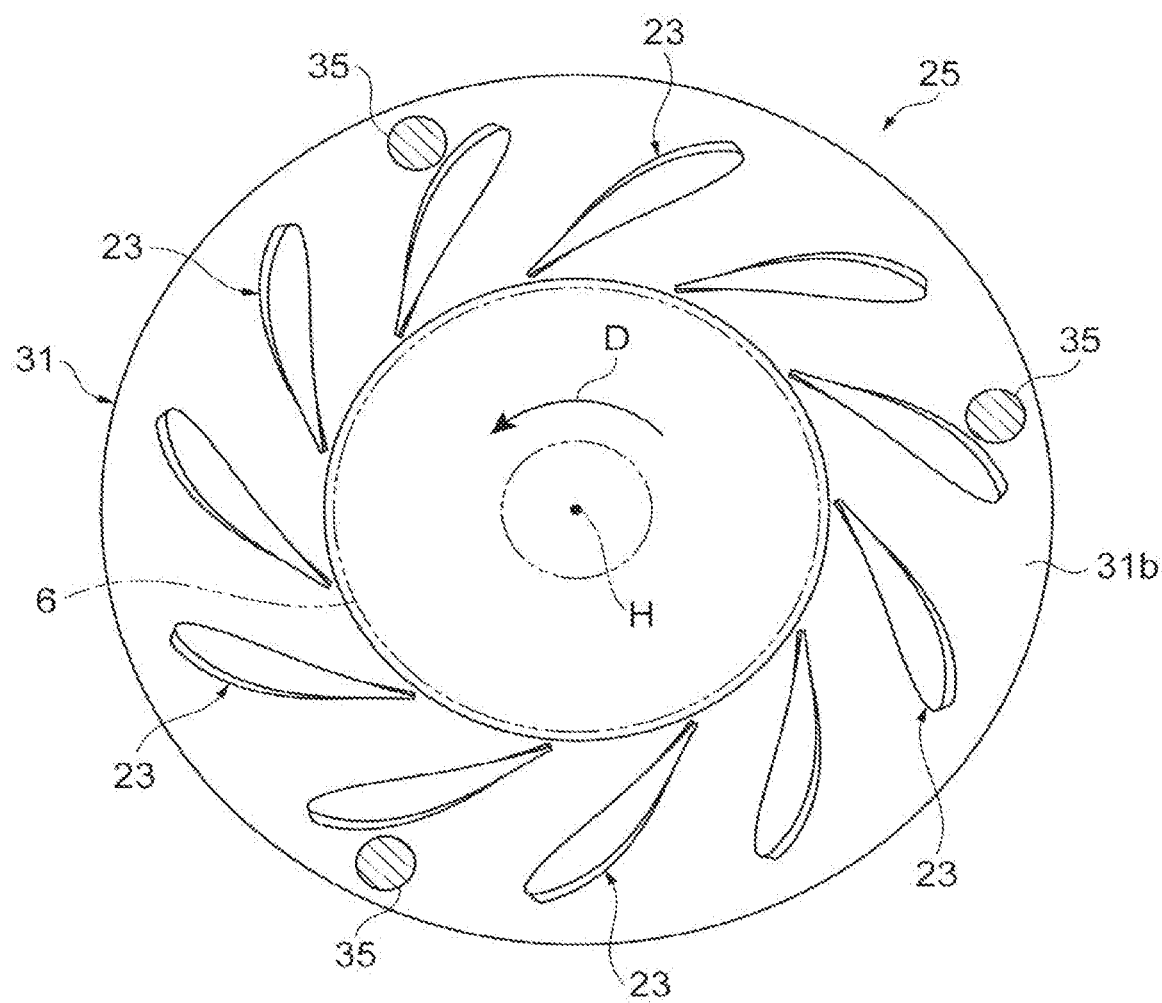
FIG. 2 is a cross-sectional view in which a variable nozzle unit is cut in a plane perpendicular to a rotation axis.
Figure 3:
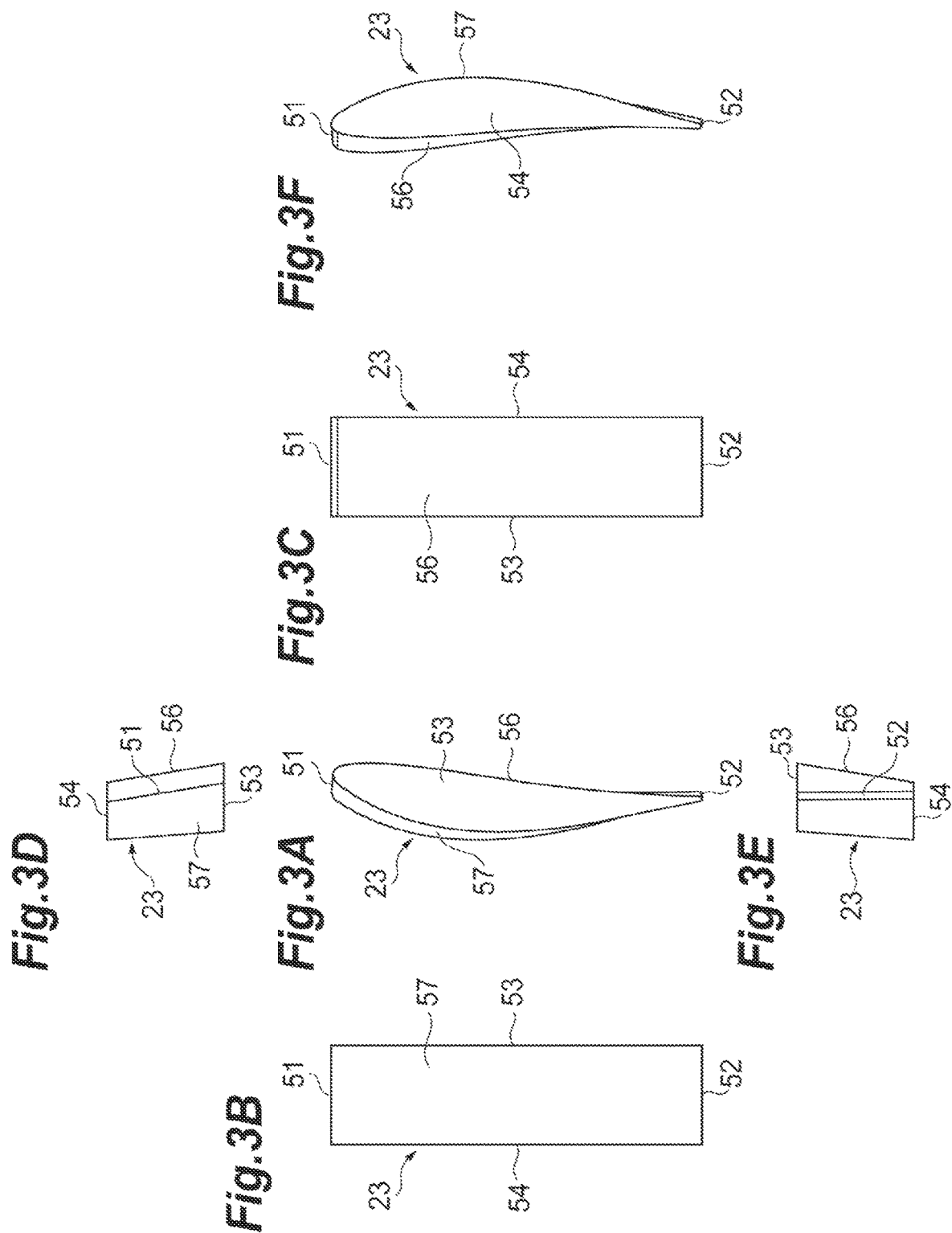
FIGS. 3A to 3F are six plane views of a variable nozzle vane.
Figure 4:
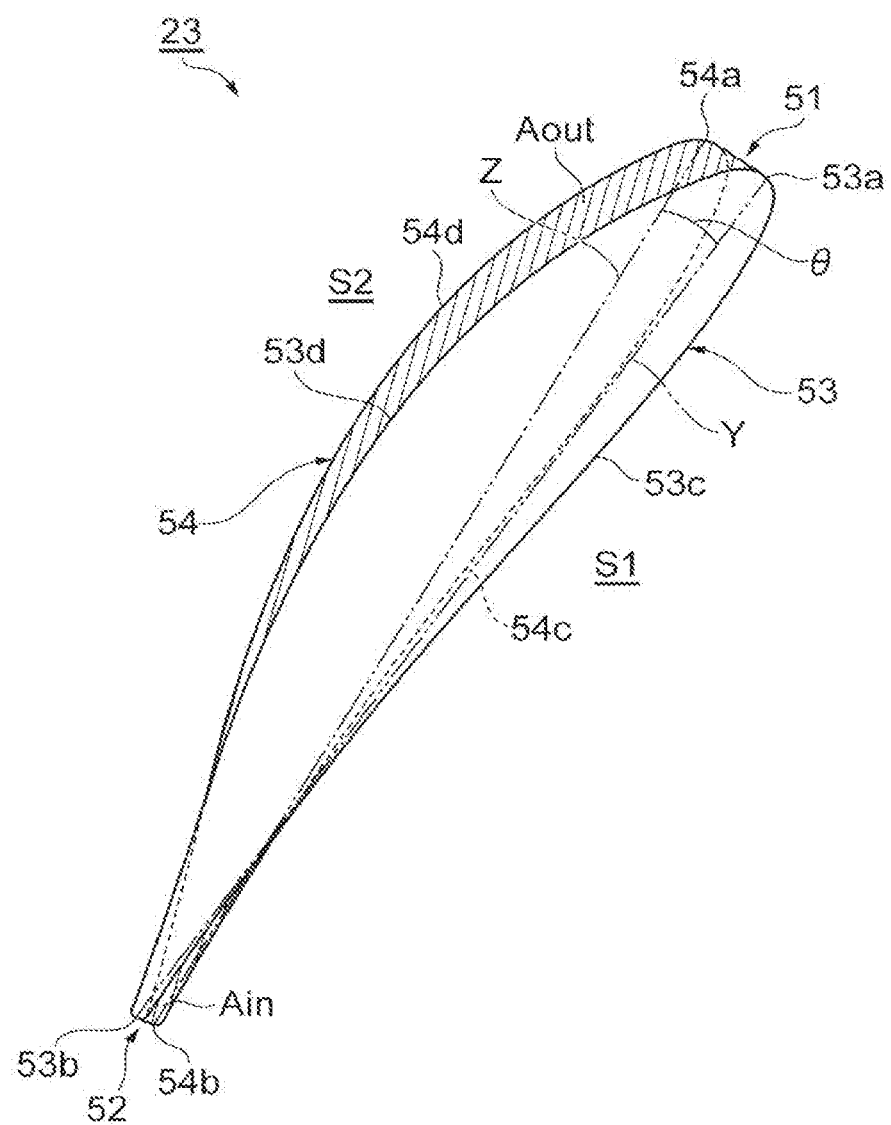
FIG. 4 is a diagram schematically illustrating a positional deviation relationship between a shroud end surface and a hub end surface of the variable nozzle vane.

As illustrated in FIGS. 2, 3, and 4, the variable nozzle vane 23 includes a leading edge 51 which is located at the upstream side and a trailing edge 52 which is located at the downstream side with respect to the flow of the gas in the gas flow passage 21. The variable nozzle vane 23 includes a flat hub end surface 54 which faces the hub wall surface 31b corresponding to a turbine side surface of the first nozzle ring 31 and a flat shroud end surface 53 which faces the shroud wall surface 32b corresponding to a compressor side surface of the second nozzle ring 32. The hub end surface 54 and the shroud end surface 53 connect the leading edge 51 and the trailing edge 52 and are respectively disposed to be orthogonal to the rotation axis H (that is, the rotation axis L). Since the hub end surface 54 and the shroud end surface 53 have, for example, the same size and shape, both surfaces are the same as each other. Furthermore, it is not essential to form the hub end surface 54 and the shroud end surface 53 to be the same as each other.

The variable nozzle vane 23 includes an inner vane surface 56 which faces a radial inside S1 and an outer vane surface 57 which faces a radial outside S2. The inner vane surface 56 faces the radial inside S1 and is curved in a concave surface shape. The outer vane surface 57 faces the radial outside S2 and is curved in a convex surface shape. The inner vane surface 56 and the outer vane surface 57 connect the leading edge 51 and the trailing edge 52 and connect the shroud end surface 53 and the hub end surface 54.

A three-dimensional shape of the variable nozzle vane 23 will be described in detail. As illustrated in FIG. 4, the hub end surface 54 protrudes to the radial outside S2 in relation to the shroud end surface 53 at the side of the leading edge 51 from the center portion between the leading edge 51 and the trailing edge 52. In other words, when the hub end surface 54 is projected to the shroud end surface 53 in the direction of the rotation axis L, the hub end surface 54 protrudes (deviates) to the radial outside S2 at the side of the leading edge 51 from the center portion with respect to the shroud end surface 53. Meanwhile, the hub end surface 54 protrudes to the radial inside S1 in relation to the shroud end surface 53 at the side of the trailing edge 52. In other words, when the hub end surface 54 is projected to the shroud end surface 53 in the direction of the rotation axis L, the hub end surface 54 protrudes (deviates) to the radial inside S1 at the side of the trailing edge 52 with respect to the shroud end surface 53.

When describing the variable nozzle vane 23 from a different viewpoint, a leading end 54a of the hub end surface 54 is located at the radial outside S2 in relation to a leading end 53a of the shroud end surface 53. An inner edge 54c and an outer edge 54d of the hub end surface 54 are respectively located at the radial outside S2 in relation to an inner edge 53c and an outer edge 53d of the shroud end surface 53 at the side of the leading edge 51 from the center portion. Meanwhile, a trailing end 54b of the hub end surface 54 is located at the radial inside S1 in relation to a trailing end 53b of the shroud end surface 53. A trailing end 55b of a midspan portion 55 is located between the trailing end 53b of the shroud end surface 53 and the trailing end 54b of the hub end surface 54. The inner edge 54c and the outer edge 54d of the hub end surface 54 are respectively located at the radial inside S1 in relation to the inner edge 53c and the outer edge 53d of the shroud end surface 53 at the side of the trailing edge 52.

The hub end surface 54 slightly protrudes to the radial inside S1. A very small part of the hub end surface 54 on the side of the trailing edge 52 protrudes to the radial inside S1. In contrast, the hub end surface 54 relatively largely protrudes to the radial outside S2. An outer area Aout corresponding to an area in which the hub end surface 54 protrudes to the radial outside S2 is larger than an inner area A in corresponding to an area in which the hub end surface 54 protrudes to the radial inside S1.

Figure 5A:
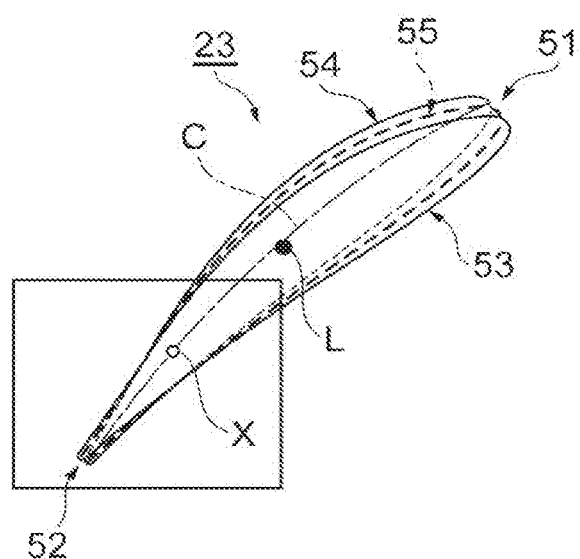
FIG. 5A is a view illustrating the variable nozzle vane from a shroud end surface side and FIG. 5B is a partially enlarged view of FIG. 5A in the vicinity of a trailing edge.

As illustrated in FIG. 5A, the variable nozzle vane 23 includes a twist center X provided in a region which is located between the trailing edge 52 and the rotation axis L and excludes both the trailing edge 52 and the rotation axis L. The variable nozzle vane 23 is twisted around the twist center X. The twist center X is, for example, a twist axis parallel to the rotation axis L. The twist center X is located at the center portion between the trailing edge 52 and the rotation axis L.

Figure 5B:
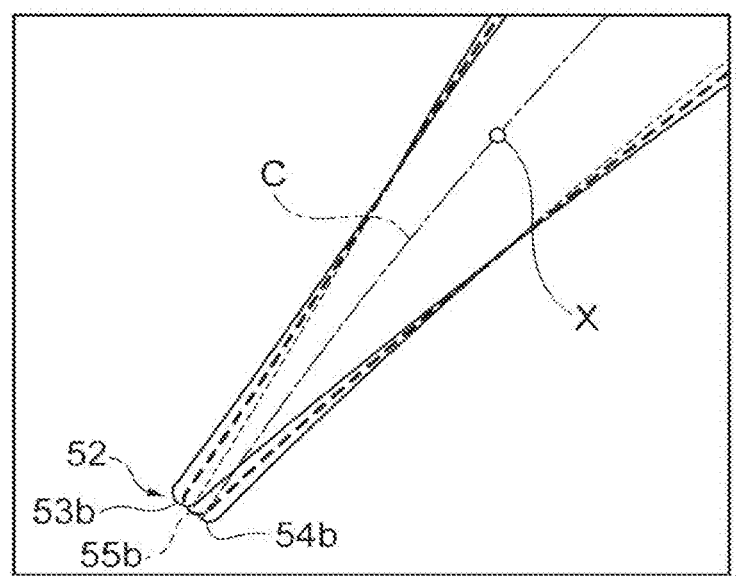

More specifically, the twist center X is located in a region of 60 to 95% from the leading edge 51 with respect to a distance between the leading edge 51 and the trailing edge 52 (that is, 100%). The twist center X may be located at a region of 70 to 85% from the leading edge 51 with respect to a distance between the leading edge S1 and the trailing edge 52. As illustrated in FIG. 5B, the twist center X is located at, for example, a position of 80% from the leading edge 51 on a camber line C. The twist center X may be provided at a region of 70 to 85% from the leading edge 51 on the camber line C. It is not essential to provide the twist center X on the camber line C. The twist center X may be provided at a position deviated from the camber line C.

A twist angle θ between the hub end surface 54 and the shroud end surface 53 is set to, for example, 1.0 to 5.0°. As illustrated in FIG. 4, the twist angle θ is, for example, an angle formed between an imaginary line Y connecting the leading end 53a and the trailing end 53b of the shroud end surface 53 and an imaginary line Z connecting the leading end 54a and the trailing end 54b of the hub end surface 54. When the twist angle θ of 1.0 to 5.0° is provided, for example, the hub end surface 54 may be rotated by 0.5 to 2.5° to the radial outside S2 (an opening direction of the variable nozzle vane 23, a counterclockwise rotation direction in FIG. 5A) with respect to the midspan portion 55. The shroud end surface 53 may be rotated by 0.5 to 2.5° to the radial inside S1 (a closing direction of the variable nozzle vane 23, a clockwise rotation direction in FIG. 5A) with respect to the midspan portion 55. A rotation angle in each direction based on the midspan portion 55 corresponds to a half (θ/2) of the twist angle θ. The twist angle θ may be 2.0 to 3.0° from the viewpoint of further improving the turbine efficiency. A line connecting a pair of points corresponding to the shroud end surface 53 and the hub end surface 54 is inclined with respect to the rotation axis L with the rotation. With the collection of innumerable inclined lines, the leading edge 51, the trailing edge 52, the inner vane surface 56, and the outer vane surface 57 can be formed.

Figure 6:
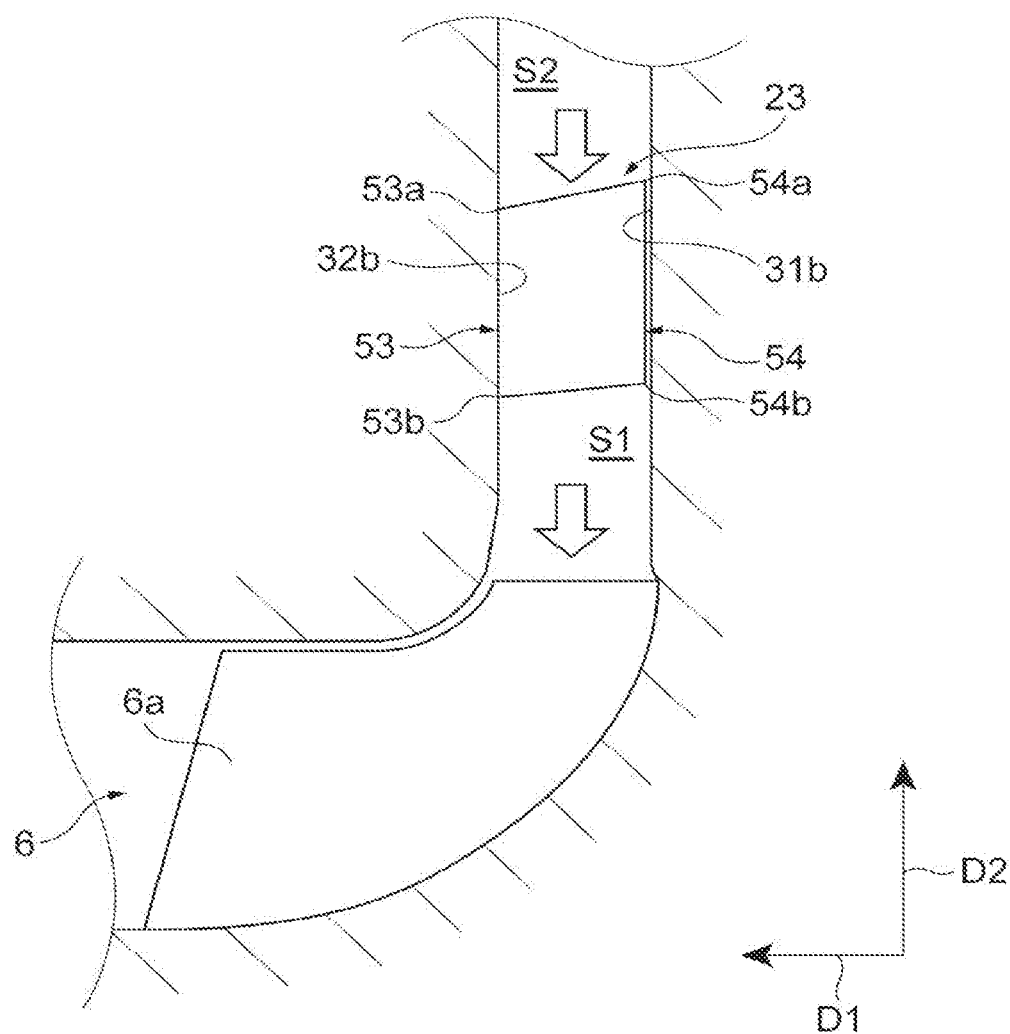
FIG. 6 is a diagram illustrating a shape of the variable nozzle vane in a meridian plane.
Figure 7:
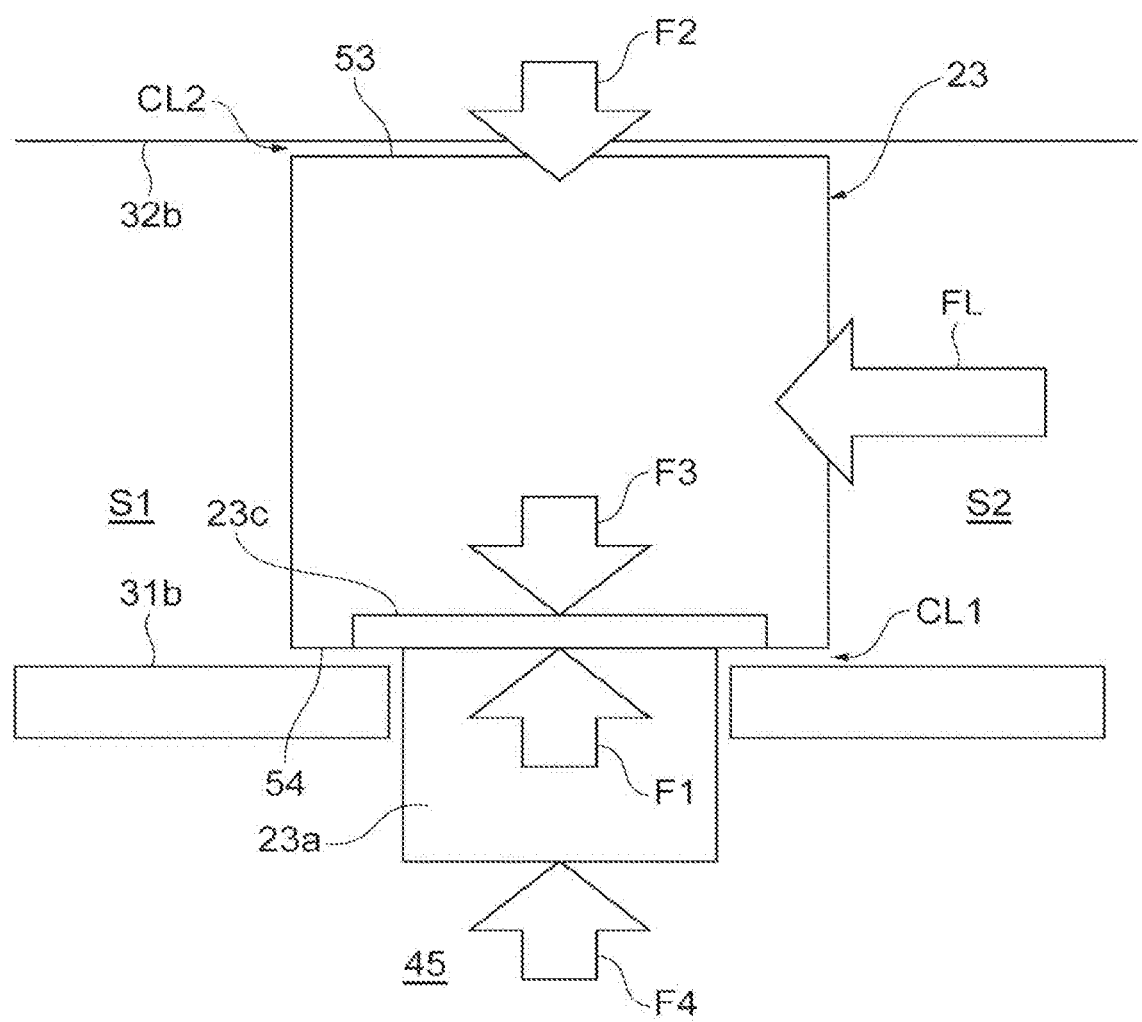
FIG. 7 is a diagram schematically illustrating various forces applied to the variable nozzle vane.

As illustrated in FIG. 6, in a meridian plane shape of the variable nozzle vane 23, the shroud end surface 53 and the hub end surface 54 are parallel to each other. Further, the hub side leading end 54a located at the rear side protrudes to the radial direction D2 (outward in the radial direction) in relation to the shroud side leading end 53a located at the front side. The hub side trailing end 54b located at the front side slightly protrudes in the radial direction D2 in relation to the shroud side trailing end 53b located at the rear side. A line connecting the shroud side leading end 53a and the hub side leading end 54a and a line connecting the shroud side trailing end 53b and the hub side trailing end 54b are all inclined in the same direction with respect to the axial direction D1. Here, an inclination of the line on the side of the trailing edge 52 is smaller than an inclination of the line on the side of the leading edge 51. In this way, a shape of the variable nozzle vane 23 in a meridian plane forms an asymmetric trapezoid shape. Furthermore, FIG. 6 also illustrates a vane portion 6a of the turbine impeller 6.

Figure 8:
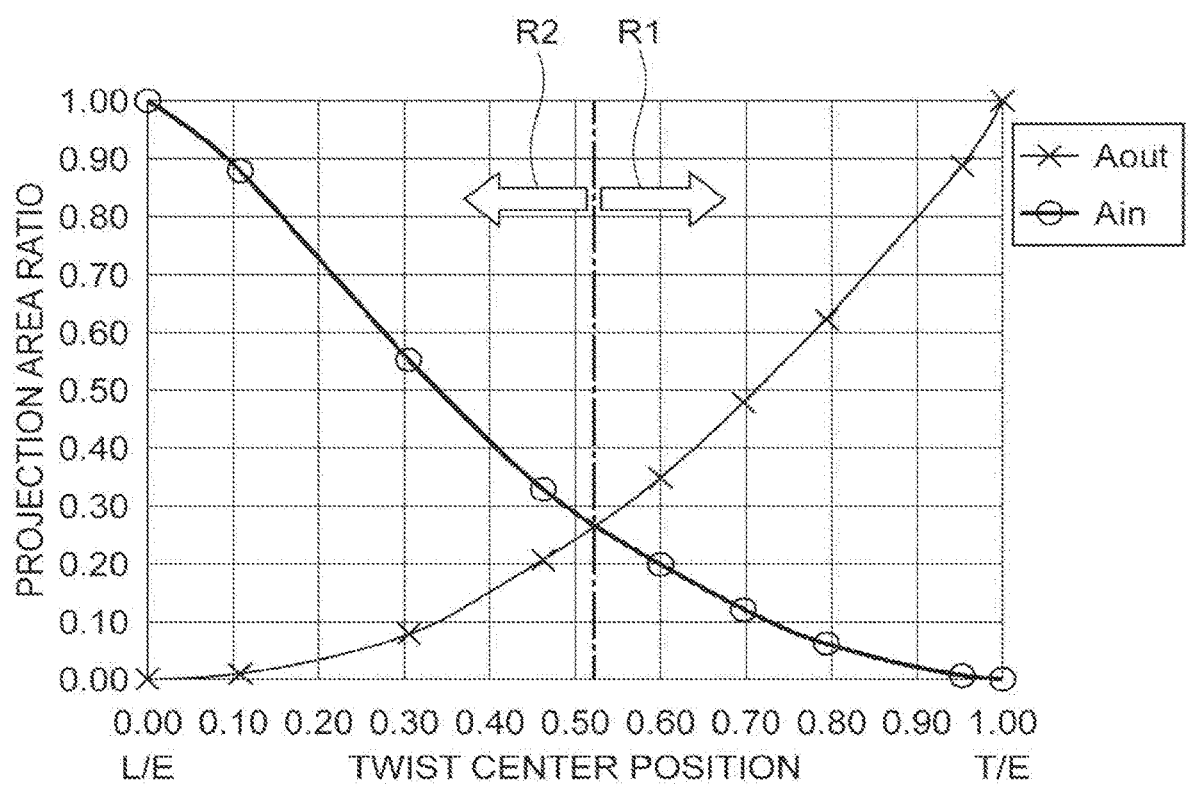
FIG. 8 is a graph showing a relationship between a twist center position and a projection area ratio.
Figure 9:
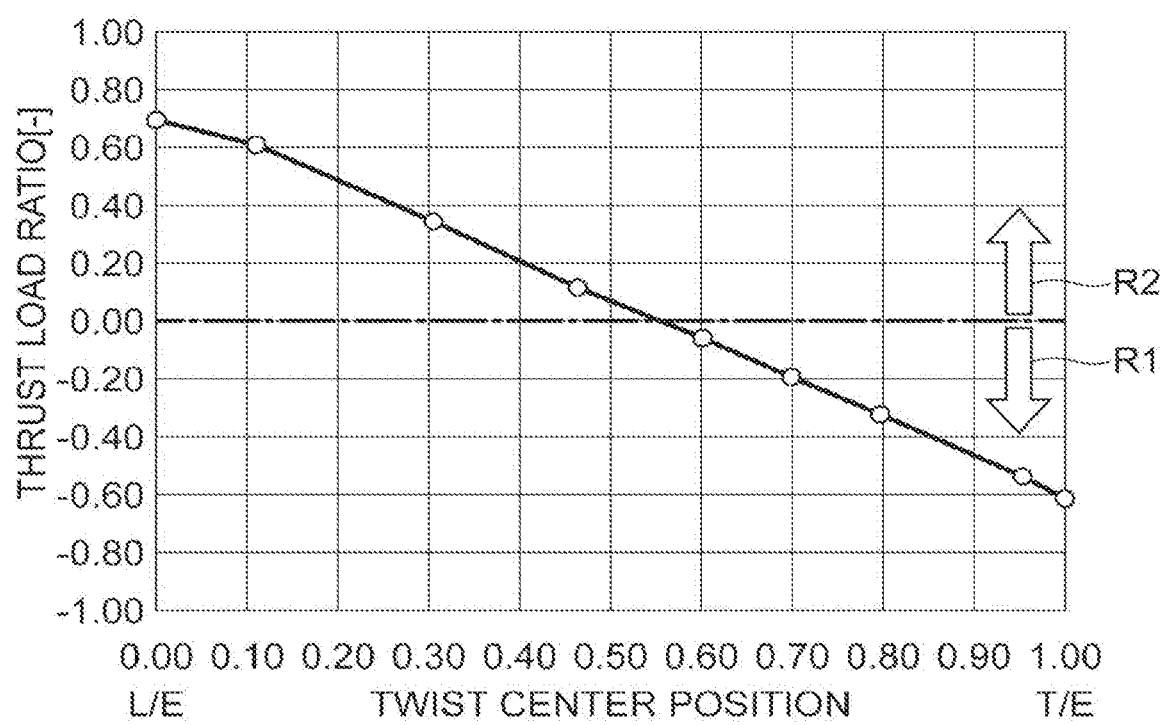
FIG. 9 is a graph showing a relationship between a twist center position and a thrust load ratio.

Next, a concept behind the three-dimensional shape of the variable nozzle vane 23 will be described with reference to FIGS. 7, 8, and 9. FIG. 7 is a diagram schematically illustrating various forces applied to the variable nozzle vane 23. FIG. 8 is a graph showing a relationship between the position of the twist center X and a projection area ratio. FIG. 9 is a graph showing a relationship between the position of the twist center X and a thrust load ratio. As illustrated in FIG. 7, several forces can be assumed as forces applied to the variable nozzle vane 23. That is, a force F1 applied to the hub end surface 54, a second force F2 applied to the shroud end surface 53, a third force F3 applied to a flange 23c when the variable nozzle vane 23 includes a shroud side flange 23c, and a fourth force F4 from a link chamber 45 (see FIG. 1) formed on the rear surface side of the first nozzle ring 31 can be assumed. Furthermore, although not illustrated in the drawings, forces applied to the inner vane surface 56 and the outer vane surface 57 can be also supposed. FIG. 7 also illustrates a gas flow FL.

In FIG. 8, a projection area ratio for the outer area Aout indicates a ratio of each outer area Aout with respect to a maximum value of the outer area Aout when the twist center X is moved from the leading edge 51 to the trailing edge 52. A projection area ratio for the inner area Ain indicates a ratio of each inner area Ain with respect to a maximum value of the inner area Ain when the twist center X is moved from the leading edge 51 to the trailing edge 52. As shown in FIG. 8, the projection area ratio is the same when the twist center X is located at the substantially center (in the vicinity of 0.5) between the leading edge 51 (L/E) and the trailing edge 52 (T/E).

As shown in FIG. 8, when the twist center X is closer to the trailing edge 52 in relation to the position in which the projection area ratio is the same, the projection area ratio for, the outer area Aout becomes dominant so that the variable nozzle vane 23 can easily move close to the hub wall surface 31b (see a region R1 of the drawing). When the twist center X is closer to the leading edge 51 in relation to the position in which the projection area ratio is the same, the projection area ratio for the inner area Ain becomes dominant so that the variable nozzle vane 23 can easily move close to the shroud wall surface 32b (see a region R2 of the drawing).

In FIG. 9, a thrust load ratio indicates a ratio of a thrust load when the twist center X is moved from the leading edge 51 to the trailing edge 52 with respect to a two-dimensional vane (a variable nozzle vane without twist). Specifically, the thrust load ratio indicates a ratio of a difference obtained by subtracting a thrust load of a two-dimensional vane from a thrust load of a three-dimensional vane with respect to the thrust load of the two-dimensional vane. Thus, in the drawings, an intersection between a graph and a line in which a vertical axis is set to 0.00 means a point in which the thrust load of the three-dimensional vane is the same as the thrust load of the two-dimensional vane. This intersection corresponds to a case in which the twist center X is located at the substantially center (the vicinity of 0.55) between the leading edge 51 (L/E) and the trailing edge 52 (T/E). Furthermore, the thrust load is set to be positive in a direction from the hub side to the shroud side.

As shown in FIG. 9, when the twist center X is closer to the trailing edge 52 in relation to the intersection, the thrust load becomes smaller than that of the two-dimensional vane so that the variable nozzle vane 23 can easily move close to the hub wall surface 31b (see the region R1 of the drawing). Meanwhile, when the twist center X is closer to the leading edge 51 in relation to the intersection, the thrust load becomes larger than that of the two-dimensional vane so that the variable nozzle vane 23 can easily move close to the shroud wall surface 32b (see the region R2 of the drawing).

In the variable nozzle unit 25 of the embodiment, since the fourth force F4 from the link chamber 45 is large, the variable nozzle vane 23 can easily move close to the shroud wall surface 32b even in the region R1 in which the variable nozzle vane 23 easily moves close to the hub wall surface 31b on the basis of the above-described correlation. That is, even when the twist center X is located at the position of 70 to 85% and is further located at the position of 60 to 95% from the leading edge 51, the variable nozzle vane 23 can move close to the shroud wall surface 32b. Furthermore, even when the variable nozzle vane 23 is provided with the flange 23c or is not provided with the flange 23c, the above-described concept is not changed.

According to the variable nozzle vane 23 and the variable nozzle unit 25 including the variable nozzle vane 23, since the plurality of variable nozzle vanes 23 are rotated in synchronization with the opening direction when the rotation speed of the engine is high and the flow amount of the exhaust gas is high during the operation of the variable displacement type turbocharger 1, the gas flow passage area (the throat area) of the exhaust gas supplied to the turbine impeller 6 increases. As a result, a large amount of the exhaust gas is supplied. Meanwhile, since the plurality of variable nozzle vanes 23 are rotated in synchronization with the closing direction when the rotation speed of the engine is low and the flow amount of the exhaust gas is small, the gas flow passage area (the throat area) of the exhaust gas supplied to the turbine impeller 6 decreases. As a result, since it is possible to increase the flow rate of the exhaust gas, the work amount of the turbine impeller 6 is secured. Accordingly, a rotational force is stably generated by the turbine impeller 6.

Here, the variable nozzle vane 23 is twisted around the twist center X located between the trailing edge 52 and the rotation axis L. When the twist center X is disposed in this way, the hub end surface 54 protrudes to the radial outside S2 in relation to the shroud end surface 53 at the side of the leading edge 51 and the hub end surface 54 protrudes to the radial inside S1 in relation to the shroud end surface 53 at the side of the trailing edge 52. Since the hub end surface 54 protrudes to the radial inside S1, the protruding area of the hub end surface 54 to the radial outside S2 decreases (see the outer area Aout of FIG. 4). Accordingly, a thrust force applied to the radial outside S2 (the high pressure side) of the variable nozzle vane 23, that is, a thrust force pressing against the hub wall surface 31b decreases. Since the thrust force to the hub side decreases, the variable nozzle vane 23 can be easily moved to the shroud wall surface 32b (see FIG. 6). As a result, it is easy to adjust the position of the variable nozzle vane 23 inside the gas flow passage 21 in the axial direction D1 as compared with the conventional variable nozzle vane described in Patent Document 1. Further, since the hub end surface 54 protrudes to the radial outside S2 at the side of the leading edge 51, a distance between the vanes at the side of the leading edge 51 of the hub end surface 54 increases. Accordingly, the turbine efficiency is improved. Particularly, in a state in which the gas flow passage area is small, the turbine efficiency is improved.

According to the variable displacement type turbocharger 1 including the variable nozzle unit 25, the variable nozzle vane 23 is close to the shroud wall surface 32b so that the shroud side clearance CL2 can be set to be zero. That is, the shroud end surface 53 of the variable nozzle vane 23 can come into contact with the shroud wall surface 32b. Accordingly, since the clearance flow at the side of the shroud wall surface 32b decreases, the turbine performance is reliably and sufficiently improved.

Since the twist angle θ is set to 1.0 to 5.0°, the turbine efficiency improvement effect and the thrust force reduction effect can be appropriately exhibited.

Since the outer area Aout is larger than the inner area Ain, a distance between the vanes at the side of the leading edge 51 of the hub end surface 54 in two adjacent variable nozzle vanes 23 and 23 increases (see FIG. 2) so that the clearance flow at the side of the shroud wall surface 32b decreases. Thus, the turbine efficiency improvement effect is obtained.

Since the twist center X is disposed at a region of 70 to 85% from the leading edge 51, a more appropriate balance is realized in the relationship between the protruding area (the outer area Aout) of the hub end surface 54 to the radial outside S2 and the protruding area (the inner area Ain) thereof to the radial inside S1. Thus, the turbine efficiency improvement effect and the thrust force reduction effect can be appropriately exhibited.

Figure 10A:
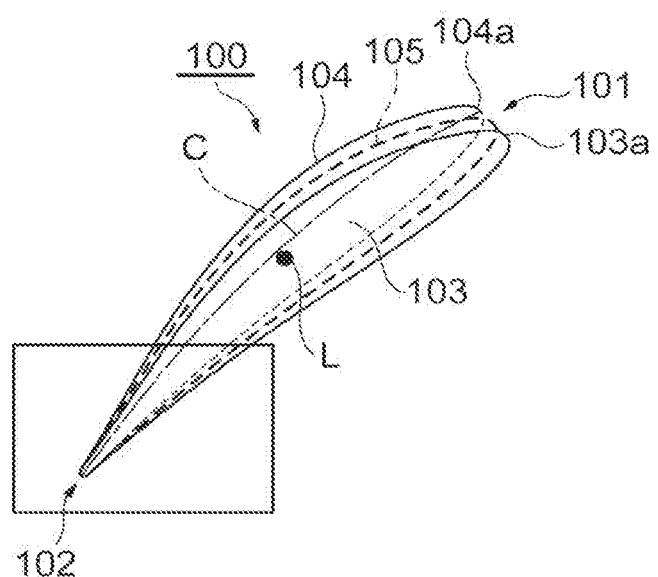
FIG. 10A is a view illustrating a variable nozzle vane according to a comparative example from a shroud end surface side and FIG. 10B is a partially enlarged view of FIG. 10A in the vicinity of the trailing edge.
Figure 10B:
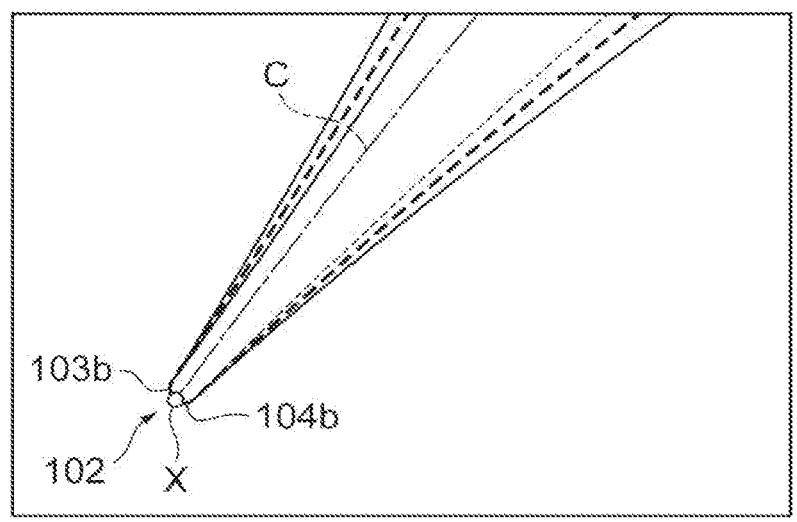

Furthermore, in a variable nozzle vane 100 according to a comparative example illustrated in FIGS. 10A and 10B, the above-described effect cannot be obtained. That is, in the variable nozzle vane 100, the position of the twist center X is set to the trailing edge 102 as a result of examining a desirable configuration in consideration of the turbine efficiency. The shroud end surface 103 and the hub end surface 104 are rotated about the twist center X with respect to the midspan portion 105. Thus, the hub end surface 104 protrudes to the radial outside S2 in relation to the shroud end surface 103 in the entire region from the trailing end 104b to the leading end 104a. The trailing end 103b of the shroud end surface 103 matches the trailing end 104b of the hub end surface 104. In the leading edge 101, the swing width of the hub end surface 104 increases. That is, the leading end 104a of the hub end surface 104 largely protrudes to the radial outside S2 in relation to the leading end 103a of the shroud end surface 103. In the variable nozzle vane 100, since the hub end surface 104 protrudes to the high-pressure radial outside S2, a thrust force in the direction of pressing against the hub wall surface 31b is largely applied and hence the variable nozzle vane 100 cannot easily move close to the shroud wall surface 32b.

This can be led to a decrease in turbine efficiency in the end. That is, the radial outside S2 of the leading edge 101 of the variable nozzle vane 100 becomes a high pressure and the radial inside S1 becomes a low pressure since the flow passage is narrow at that portion. That is, in order to speed up the flow, the pressure is converted to velocity energy and low pressure. Accordingly, since the leakage flow passing through the nozzle side clearance portion increases from the radial outside S2 toward the radial inside S1, mixing loss to a main flow increases. At the same time, since the impeller inflow angle increases, performance may decrease due to an increase in incidence loss. That is, the flow angle increases due to a decrease in mass flow amount of the main flow. In particular, when the shroud side clearance CL2 increases, the leakage flow through the nozzle side may flow into the tip clearance and tip clearance loss may increase.

Figure 11B:
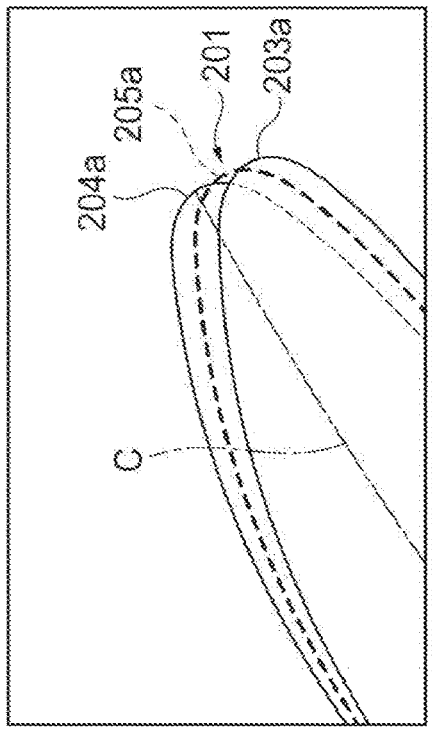
FIG. 11B is a partially enlarged view of FIG. 11A in the vicinity of a leading edge.
Figure 11C:
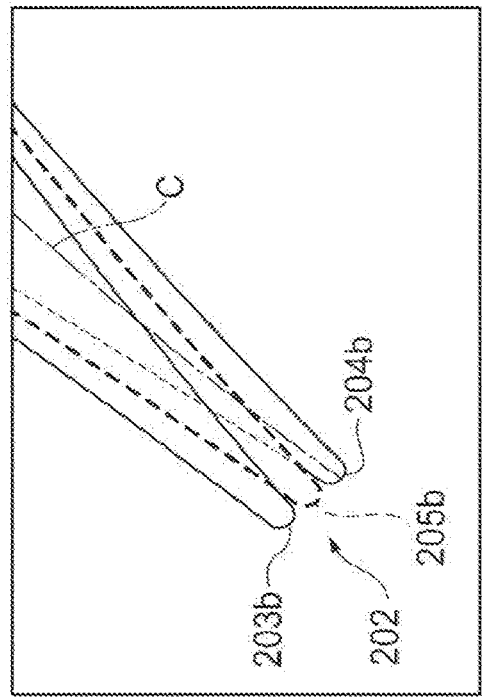
FIG. 11C is a partially enlarged view of FIG. 11A in the vicinity of the trailing edge.
Figure 11A:
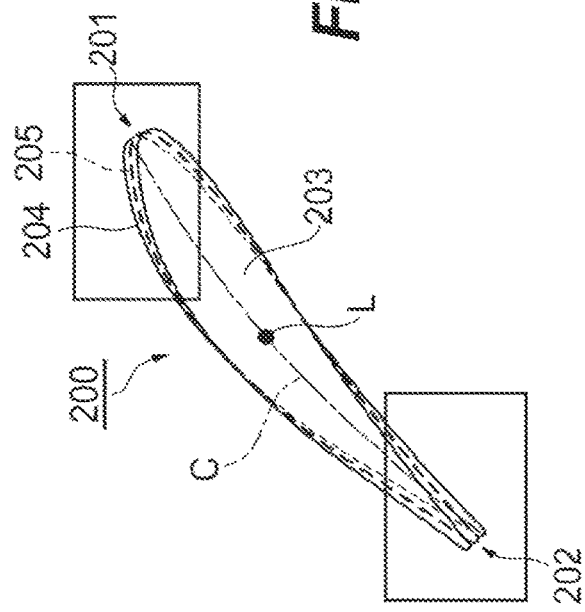
FIG. 11A is a view illustrating a variable nozzle vane according to a comparative example from a shroud end surface side.

Further, also in a variable nozzle vane 200 according to a comparative example illustrated in FIGS. 11A to 11C, the above-described effect cannot be obtained. That is, in the variable nozzle vane 200, the twist center X is set to the rotation axis L. The shroud end surface 203 and the hub end surface 204 are rotated about the twist center X with respect to the midspan portion 205. Thus, the hub end surface 204 protrudes to the radial outside S2 in relation to the shroud end surface 203 at the side of the leading edge 201. The leading end 204a of the hub end surface 204 protrudes to the radial outside S2 in relation to the leading end 203a of the shroud end surface 203. The leading end 205a of the midspan portion 205 is located at the center thereof. Meanwhile, the hub end surface 204 protrudes to the radial inside S1 in relation to the shroud end surface 203 at the side of the trailing edge 202. The trailing end 204b of the hub end surface 204 protrudes to the radial inside S1 in relation to the trailing end 203b of the shroud end surface 203. The trailing end 205b of the midspan portion 205 is located at the center thereof. In the variable nozzle vane 200, the swing width of the hub end surface 204 is the same at the side of the leading edge 201 and the trailing edge 202. Thus, since the protruding of the hub end surface 204 to the radial outside S2 is limited, a distance between the vanes at the hub wall surface 31b can be increased. Thus, the turbine efficiency is not improved satisfactorily.

As described above, in the variable nozzle vane 23 and the variable nozzle unit 25 according to the embodiment of the present disclosure, since the position of the twist center X is set to a specific range which does not exist conventionally, it is possible to improve the turbine efficiency and to hold the variable nozzle vane 23 by the shroud wall surface 32b at the same time. Regarding this point, the variable nozzle unit 25 is superior to the variable nozzle vanes 100 and 200.

Hereinbefore, although the embodiments of the present disclosure have been described, the present invention is not limited to the above-described embodiments. All variable nozzle vanes 23 may not adopt the above-described configuration. A part (one or some) of the plurality of variable nozzle vanes 23 may adopt the above-described configuration of the embodiments.

The present disclosure is not limited to a case in which the variable nozzle vane 23 is axially supported in a cantilevered manner, but may be applied to a case in which the variable nozzle vane is axially supported at both ends thereof. When the variable nozzle vane is axially supported at both ends thereof, the second nozzle ring 32 is also provided with a bearing hole and the rotary shaft provided in the variable nozzle vane 23 is rotatably inserted through the bearing hole.

When the variable nozzle vane 23 is axially supported in a cantilevered manner, a second flow passage wall surface may be formed by the turbine housing 4. That is, the second nozzle ring 32 may be omitted. In this case, the variable nozzle vane 23 is attached to the first nozzle ring 31 and faces the second flow passage wall surface which is a part of the turbine housing 4.

INDUSTRIAL APPLICABILITY

According to some aspects of the present disclosure, the variable nozzle vane can be easily moved toward the shroud side.

REFERENCE SIGNS LIST

1: variable displacement type turbocharger, 2: turbine, 3: compressor, 4: turbine housing, 6: turbine impeller, 7: compressor impeller, 14: rotary shaft, 16: scroll flow passage, 21: gas flow passage, 23: variable nozzle vane, 25: variable nozzle unit, 31: first nozzle ring, 31b: hub wall surface, 32: second nozzle ring, 32b: shroud wall surface, 51: leading edge, 52: trailing edge, 53: shroud end surface, 54: hub end surface, C: camber line, H: rotation axis, S1: radial inside, S2: radial outside, X: twist center, θ: twist angle.

The invention claimed is:

1. A variable nozzle unit used in a turbine including a gas flow passage through which a gas flowing from a scroll flow passage to a turbine impeller passes and a hub wall surface and a shroud wall surface which face each other in a direction of a rotation axis of the turbine impeller and form the gas flow passage, comprising:

a variable nozzle vane which is disposed between the hub wall surface and the shroud wall surface and is rotatable about a rotation axis parallel to the rotation axis of the turbine impeller inside the gas flow passage, wherein the variable nozzle vane includes a leading edge, a trailing edge, a hub end surface facing the hub wall surface, and a shroud end surface facing the shroud wall surface, and wherein the variable nozzle vane is twisted around a twist center located between the trailing edge and the rotation axis of the variable nozzle vane so that the hub end surface protrudes to a radial outside of the rotation axis of the variable nozzle vane in relation to the shroud end surface at the leading edge side and the hub end surface protrudes to a radial inside of the rotation axis in relation to the shroud end surface at the trailing edge side.

2. The variable nozzle unit according to claim 1,
wherein a twist angle between the hub end surface and the shroud end surface is set to 1.0 to 5.0°.

3. The variable nozzle unit according to claim 2,
wherein an outer area in which the hub end surface protrudes to the radial outside in relation to the shroud end surface is larger than an inner area in which the hub end surface protrudes to the radial inside in relation to the shroud end surface.

4. The variable nozzle unit according to claim 3,
wherein the twist center is located at a region of 70 to 85% from the leading edge with respect to a distance between the leading edge and the trailing edge.

5. A turbocharger comprising:
the variable nozzle unit according to claim 4 provided in the turbine.

6. A turbocharger comprising:
the variable nozzle unit according to claim 3 provided in the turbine.

7. The variable nozzle unit according to claim 2, wherein the twist center is located at a region of 70 to 85% from the leading edge with respect to a distance between the leading edge and the trailing edge.

8. A turbocharger comprising:
the variable nozzle unit according to claim 7 provided in the turbine.

9. A turbocharger comprising:
the variable nozzle unit according to claim 2 provided in the turbine.

10. The variable nozzle unit according to claim 1, wherein an outer area in which the hub end surface protrudes to the radial outside in relation to the shroud end surface is larger than an inner area in which the hub end surface protrudes to the radial inside in relation to the shroud end surface.

11. The variable nozzle unit according to claim 10, wherein the twist center is located at a region of 70 to 85% from the leading edge with respect to a distance between the leading edge and the trailing edge.

12. A turbocharger comprising:
the variable nozzle unit according to claim 11 provided in the turbine.

13. A turbocharger comprising:
the variable nozzle unit according to claim 10 provided in the turbine.

14. The variable nozzle unit according to claim 1, wherein the twist center is located at a region of 70 to 85% from the leading edge with respect to a distance between the leading edge and the trailing edge.

15. A turbocharger comprising:
the variable nozzle unit according to claim 14 provided in the turbine.

16. A turbocharger comprising:
the variable nozzle unit according to claim 1 provided in the turbine.

* * * * *